United States Patent [19]

Adolfsson et al.

[11] Patent Number: 4,972,706
[45] Date of Patent: Nov. 27, 1990

[54] DEVICE FOR MEASURING THE FLATNESS OF ROLLED STRIP

[75] Inventors: Lars Adolfsson, Västeras; Kent Blomkvist, Surahammar; Ake Persson, Västeras, all of Sweden

[73] Assignee: Asea Brown Boveri AB, Västeras, Sweden

[21] Appl. No.: 359,367

[22] Filed: May 31, 1989

[30] Foreign Application Priority Data

Jun. 2, 1988 [SE] Sweden .................. 8802059

[51] Int. Cl.$^5$ .................. G01L 5/04; G01L 5/06; B21B 37/04
[52] U.S. Cl. .................. 73/159; 73/862.07; 72/17
[58] Field of Search .................. 73/159, 862.07; 72/17, 72/18

[56] References Cited

U.S. PATENT DOCUMENTS

| | | | |
|---|---|---|---|
| 3,581,536 | 6/1971 | Terwilliger | 72/17 |
| 3,817,095 | 6/1974 | Diolot | 73/159 |
| 4,116,029 | 9/1978 | Fabian et al. | 73/159 |
| 4,188,809 | 2/1980 | Ishimoto et al. | 73/159 |
| 4,332,154 | 6/1982 | Nordvall | 73/862.07 |
| 4,674,310 | 6/1987 | Ginzburg | 73/159 |
| 4,680,978 | 7/1987 | Ginzburg et al. | 72/17 |

FOREIGN PATENT DOCUMENTS

| | | | |
|---|---|---|---|
| 0273807 | 7/1988 | European Pat. Off. | 72/17 |
| 0093035 | 7/1980 | Japan | 73/862.07 |
| 0017320 | 1/1986 | Japan | 72/18 |
| 8705836 | 10/1987 | World Int. Prop. O. | 72/17 |

Primary Examiner—William A. Cuchlinski, Jr.
Assistant Examiner—Diego F. F. Gutierrez
Attorney, Agent, or Firm—Watson, Cole, Grindle & Watson

[57] ABSTRACT

A flatness measuring device for rolled strip (5) according to the invention comprises a measuring roller over which the rolled strip passes. The measuring roller is divided into a number of roller sections (6). The forces on the roller sections are measured and can then be converted, via recalculations, into a measure of the flatness of the strip, whereby a flatness profile across the strip can be obtained. Special to the invention is the method of measuring the force. Between each roller section (6) there is a side member (ABC) which supports the shaft ends (7) of two adjacently positioned roller sections. The side member in principle consists of three beams (A, B, C) connected together in the form of a triangle. The beam A for all the side members is attached to a common plate (1). The first ends of the beams A and B connected together via a flexible diaphragm (2). At the second end of the beam B the shafts are journalled. The beam C which connects the second ends of beams A and B consists of a force transducer (FIG. 4).

6 Claims, 2 Drawing Sheets

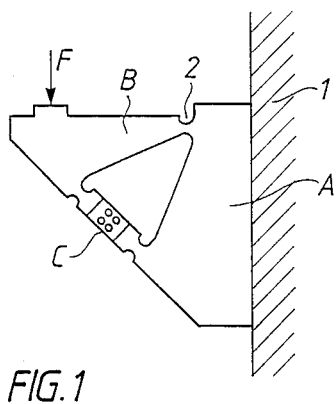
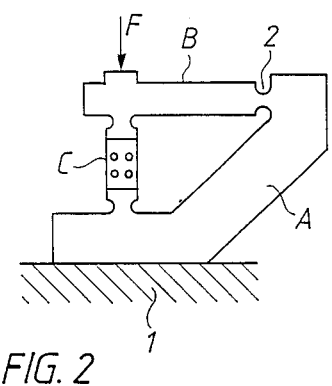
FIG. 1   FIG. 2
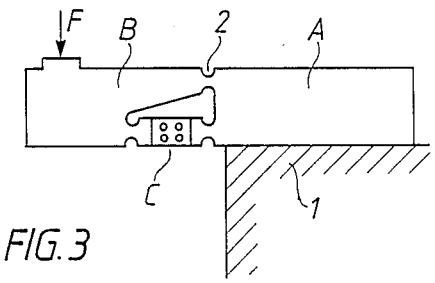
FIG. 3
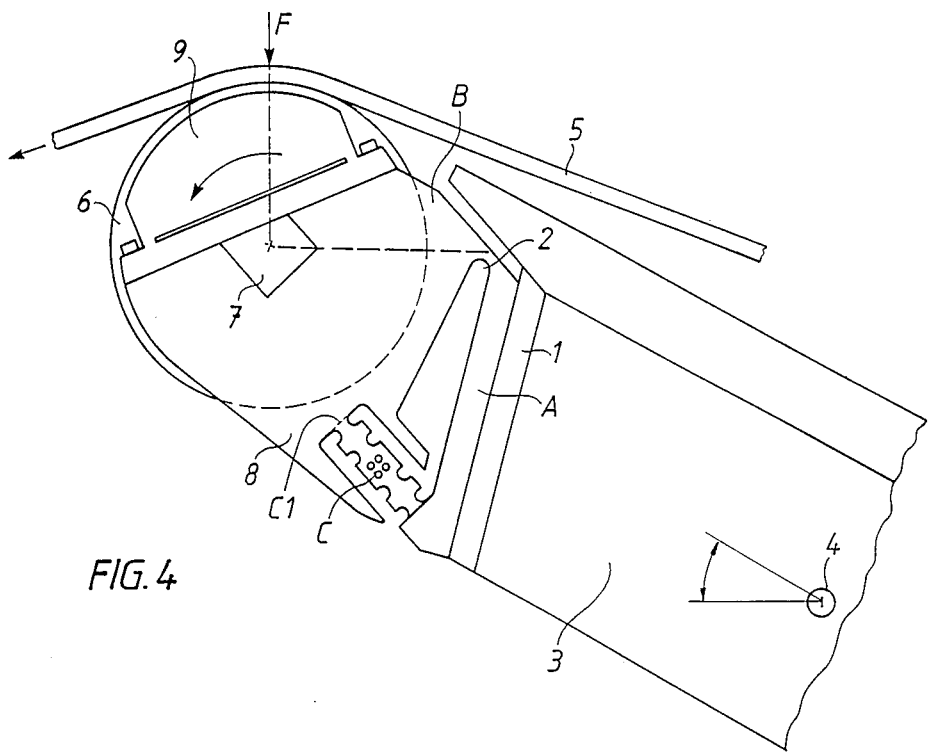
FIG. 4

DEVICE FOR MEASURING THE FLATNESS OF ROLLED STRIP

TECHNICAL FIELD

In cold rolling of strip there is a requirement for flatness measurement on the strip in order to influence and control the desired profile, and, indeed, the same requirement also exists in connection with hot-rolled strip. Since the process, conditions are so different, it is difficult directly to apply the same measuring apparatus.

In cold rolling of strip, for example, the strip temperature normally amounts to 150-200° C. at the most, whereas the strip temperature in hot rolling normally lies between 800 and 1000° C. The tension in the rolled strip is also considerably higher in cold rolling than in hot rolling.

Flatness measuring devices, or shapemeters, for strip are described in several patent specifications, for example in Swedish Patent Nos. 305 966 and 388 481. The measuring device described in these specifications comprises a measuring roller divided into a number of measuring zones or sub-rollers with transducers which give the current force distribution in the width of the strip as the strip passes through the measuring roller. The stress distribution thus obtained is an indirect measure of the strip flatness which can thus be obtained by means of recalculations which take into account the properties of the material in question.

The strip flatness is often defined as $\Delta L/L$, where $\Delta L$ is the change in length because of unflatness along a plane distance L of the strip in its longitudinal direction. According to Hooke's law, this can be related to $\Delta \sigma E$, where $\Delta \sigma$ is the change in strip tension and E is the modulus of elasticity of the strip material. The specific strip tension, in turn, gives rise to the compressive force and the change in compressive force, respectively, that can be measured in each measuring zone.

The present invention relates to an indirect strip flatness meter for both a hot-rolled and a cold-rolled strip of both metallic and non-metallic materials which measures force on a measuring roller divided into a number of sub-rollers.

BACKGROUND ART, TECHNICAL PROBLEM

To be able to describe the invention and also show the technical problems in connection with rolling of strip that the invention is capable of solving, by way of example a very brief description will first be given of the most important parts of a finishing mill in which the invention may be used.

Such a mill normally consists of up to 6 or 7 mill stands positioned one after the other with a subsequent cooling distance of up to 80-100 m and a coil for rolling up the rolled and cooled strip.

Between the mill stand, so-called loopers are positioned with a roller over which the strip runs. The looper is rotatably eccentrically journalled in relation to the centre of the roller. The rolling is controlled with respect to keeping the angle between a line in the horizontal plane and the line between the centre of rotation of the looper and the centre of the roller constant and equal for all the loopers, and with respect to a speed control. As the strip passes through the mill stand, the speed of the strip increases. For this reason, there is also a superordinate control which adjusts the speed for the rolls of each mill stand so that the angle of the loopers can be kept constant.

The roller of the looper is used as a measuring roller and is therefore divided into a number of sub-rollers which may be loaded with a force which can be varied within quite large limits depending on the winding angle of the strip, the desired accuracy of the flatness profile, the strip thickness in question, the temperature, the material composition, etc. A total force on the measuring roller of 30-50 kN and more may very well exist.

There are several factors which may lead to the flatness of the strip not being the desired one. There are also some different methods to influence the strip flatness so as to attain the desired flatness. To be able to perform some form of control of the strip flatness, it is necessary in some way to determine the flatness of the strip or the strip profile across the strip.

One of the main requirements on a good strip mill is that the coiled strip shows good flatness. To achieve this, considerable knowledge of the process is normally required. A flat, coiled strip need not always mean that the strip as it leaves the last mill stan shall have a straight flatness profile. As a matter of fact, in order to obtain a flat strip during the coiling, the optimum profile of the strip as it leaves the last mill stand is dependent on the cooling process of the strip, etc.

The profile that the strip has when it arrives at the last mill stand is substantially dependent on the original flatness of the strip and on the mutual parallelism and curvature of the rollers mounted in the mill stand. If these rollers are not correctly adjusted, the strip may exhibit buckles as a result of the strips—according to the technical terminology —becoming "long edge" or "long middle". Thus, the strip may have a tendencey to become longer at the edges and at the centre of the strip, respectively.

As stated above, the rolling of the strip may entail problems in obtaining the desired properties of the end product. If the current strip flatness is available, for example between the last two mill stands, it will be possible to influence the flatness by adjusting the rollers mounted in the mill stands. The desire to have knowledge of the strip profile at or near the last mill stands in a strip mill has existed for a long time and various methods and means have been developed—with more or less successfull results.

A rough estimate of the unflatness of cold-rolled or hot-rolled strip is described in U.S. Pat. No. 4,512,170. Here the measuring roller is not divided into measuring zones, but it is stated that with knowledge of the current forces, the deflection or bending moment on the shaft of the measuring roller in the vicinity of its ends, and by comparison with theoretically predicted values of unflatness for these parameters, a measure of the current strip profile can be obtained. The accuracy of such a method cannot, with all necessity, be particarly great.

U.S. Pat. No. 4,116,029 discloses a measuring roller for measuring the flatness of rolled strip, the measuring roller being divided into a number of measuring zones, each having a roller section supported by two side members. By measuring the force to which each side member is subjected, a measure of the flatness of the strip can thus be obtained. The embodiment in this patent which may be of a certain interest for the invention, as showing the prior art, is shown in FIG. 3 of the patent. In this embodiment the measuring element is mounted on an arm which is hinged to the side members and is movable in three hinges. In such a design, there must be a considerable risk of play and friction in the hinges. This in turn leads to poor positional tolerance of the rollers and to hysteresis of the transducer signals. Since each roller section, as well as other known measuring rollers divided into roller sections, have two side members, the gap which occurs between the rollers may become quite significant, which may lead to a risk of marking of the strip. There is also a considerable risk of the gap being filled with oxide scales from the strip which may give rise to an uncontrolled coupling between adjacent measuring rollers.

An extensive description of known principles for flatness measurement is given in and article entitled "New developments improve hot strip shape: Shapemeter-Looper and Shape Actimeter" published in "Iron and Steel Engineer", August 1986, pages 48–56. FIG. 9 of this article is a reproduction of the embodiment described above.

As belonging to the state of the art, however without relevance to the invention, can also be mentioned equipment for non-contact determination of the flatness of a strip with the aid of optical systems and also with the aid of acoustic waves.

BRIEF DESCRIPTION OF THE DRAWING

FIGS. 1, 2 and 3 show, in broad outline, various embodiments of a fundamental construction of a side member for supporting roller sections in a flatness meter according to the invention.

FIG. 4 shows a preferred embodiment of a side member with force-sensing members and the associated saddle, and further a roller section, a moving strip, and a looper.

DISCLOSURE OF THE INVENTION

Figure 5:
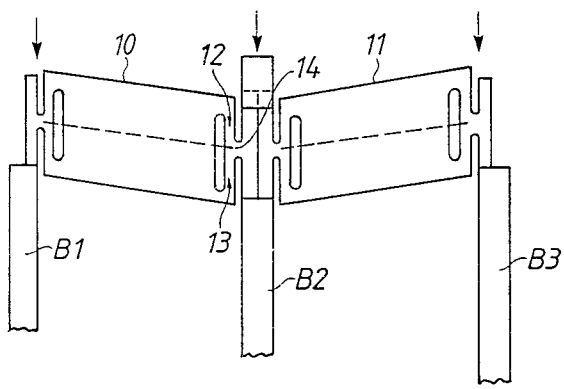
FIG. 5 shows how the shafts of the roller sections can be formed to allow a certain individual mobility of the roller sections, as to be able to take up certain temperature differences between roller sections and other parts of the flatness meter.

A flatness meter according to the invention comprises a measuring roller divided into a number of roller sections. The roller sections have separate shafts Where the shafts for two adjoining roller sections meet, they are attached to a common side member mounted between the roller sections. The individual side members, in turn, are mounted on a common plate attached to the previously mentioned looper. The force measurement is preferably performed by means of magnetoelastic force transducers attached in a manner special to the invention.

The invention comprises the distribution of side members along the measuring rollers, the embodiment of the attachment of the force transducers, and the embodiment and attachment of the shafts to be able to measure the different forces that may arise across the strip.

The attachment of the force-sensing member is performed, according to the invention, in the side members supporting the roller sections. If the force-sensing member consists of a magnetoelastic transducer, the measuring portion may advantageously constitute an integral part of the side member, that is to say, the side member and the transducer can be manufactured from one and the same material. It is self-evident, however, that separate complete force transducers can be mounted in the side member. However, this requires grinding of attachment surfaces and other adjustment work, which can be both work-demanding and costly.

The mechanical dimensioning of the side members and the dimensioning of the force transducers attached to the side members are performed on the basis of how great a proportion of the total force that each side member is to take up and while allowing for a sufficient margin for the spread of the force that may arise along the strip width.

FIGS. 1–3 show three alternative designs of side members according to the invention. All are based on the same principle involving a circular force transmission, around a moment arm centre, from the force of the strip on the shaft of the roller section to the force transducer.

The side member according to FIG. 1 largely comprises three beams fixed together in the form of a triangle. By means of a beam A the side member is fixed to a plate 1 which is then mounted on the tilting table. At the first end of the beam A, via a weakening in the form of a diaphragm 2, tee first end of the beam B is attached The force F from the strip via the centre of the shaft of the roller section is applied to the second end of the beam B, whereby a turning moment is obtained around the diaphragm 2 which is equal to the product of the force F and the length of the beam B between the diaphgram and the point of application of the force.

The third beam C of the side member consists of force transducers connecting the second ends of the beams A and B. If the moment active length of the beam B is equal to the distance from the diaphgram 2 to the point of application of the force transducer, the force sensed by the force transducer will be a result of the forces acting on the two roller sections located on each side of the side member, except for the marginal part which is shunted via the diaphgram.

Based on the equality of moments, it is possible, by varying the distance from the diaphgram to the point of application of the force transducer, to obtain a force on the transducer which is greater than or smaller than the force obtained from the roller sections.

Another way of varying the force is to angularly adjust or turn the transducer such that its longitudinal symmetry axis does not lie perpendicular to the moment arm from the diaphragm to the point of application of the force.

The three beams A, B and C from FIG. 1 are also easily identifiable on a side member according to FIG. 2. A certain moment load may arise on the force transducer because of the minimum rotation of the beam B around the diaphragm 2 which after all occurs.

A third alternative for a side member design is clear from FIG. 3. Also here the beams A, B and C are identifiable.

It goes without saying that there are a number of similar side member designs which are also embraced by the invention. For all these designs the general rule applies that the force resultant from the strip against each roller section should make an angle of 90° with the moment arm from the diaphgram to the shaft centre of the rollers in order to obtain the greatest possible force into the force transducers. However, the angle of the looper with the horizontal plane, which admittedly for one and the same strip and otherwise the same process conditions should be kept constant, may vary for optimum rolling when different strips are to be rolled. The winding angle of the strip around the roller sections may then vary somewhat, which, in turn, causes the angle of the application of force in relation to the moment arm to vary somewhat around the optimum 90° angle. To obtain as accurate a measurement of the strip profile as possible, as previously indicated the shafts of the roller sections must not be too rigidly connected to each other. To this end, the shafts have been provided with diaphgrams which enable a certain relative movement between the side members and which enable the shafts to take up differences in temperature between the shafts and the common plate on which the side members are mounted.

A special embodiment of the saddle which locks the shafts of the roller sections to the side members is also part of the invention. In spite of the fact that each side member supports and constitutes attachment of the shaft ends for two adjacently positioned roller sections, the embodiment permits a practically individual attachment of the roller sections.

DESCRIPTION OF THE PREFERRED EMBODIMENTS

A preferred embodiment of a side member according to the invention is clear from FIG. 4. The figure comprises a looper 3 with a centre of rotation 4. A moving rolled strip 5 slides on the looper 3 and surrounds parts of the outer shell ring of the roller section 6. This ring is axially guided in conventional manner and journalled via ball bearings on the shaft of the roller section 6. Different attachments of the shaft ends to the side members may be used. As will be clear from the embodiment shown in FIG. 4, the shaft end 7 has a parallel trapezoidal shape with a corresponding opening in the force-absorbing part 8 of the side member. To facilitate the mounting of the roller sections 6 and lock the shaft ends, each force-absorbing side member is associated with a saddle 9 which is also shaped in a special manner because one side member is to support and constitute attachment of the shaft ends for two adjacently positioned roller sections. The embodiment of the saddle 9 will be described below.

From FIG. 4 it is also clear that it is a side member design according to FIG. 1 that constitutes a preferred embodiment. The beam A is attached to the plate 1, which is common to all beams A, this plate 1 in turn being mounted on the looper 3. The resultant force from the rolled strip 5, acting on the shaft centre, produces a minimum circular rotating movement around the diaphgram 2 and a corresponding moment and force on the force transducer C, which can comprise a strain gauge or a magnetoelastic transducer. The measuring portion is shown in this figure as an integral part of the beam C but may, as mentioned above, be a separate transducer C1 mounted in this beam.

At the attachment to the side members, the shaft ends have an embodiment which comprises a first and a second diaphgram which permit a reduction of the stresses in the shafts caused by temperature differences between roller sections and the plate which is common to the side members, as well as a third diaphgram which permits individual deflection of the side members.

To explain how the diaphgrams are formed, a body in the form of a segment of a cylinder will be defined A segment of a cylinder is defined by two equal and parallel circular segments and that part of a straight cylindrical envelope surface which connects the circular arcs of the circular segments and a rectangle having sides equal to the chords of the circular segments and the distance between the circular segments. If two equal cylindrical segments with parallel rectangular surfaces are cut away from a circular cylinder, what remains is a body in the form of a central-symmetrical chord bar—hereafter called chord bar—with a height equal to the distance between the circular segments and a width equal to the distance between the chords in the same plane.

If, according to FIG. 5, two equal circular segments with parallel rectangles are worked away parallel to and near to a shaft end, a first chord bar is formed If the width of this bar is made sufficiently small, a certain flexibility may be obtained between the shaft 10 and its shaft end The chord bar 14 can then function as a diaphragm and constitutes the previously mentioned third diaphgram The shaft end can conveniently be shaped as previously described and as shown at 7 in FIG. 4 In that case, the chord bar will have a shortened length.

By working away a second chord bar with a width somewhat smaller than the diameter of the shaft and with rectangles parallel to the first chord bar, parallel to and near this bar, two diaphgrams 12 and 13 are formed in that shaft end wall which faces the first chord bar, i.e. one diaphgram on one side each of the first chord bar. These two diaphgrams constitute the first and second diaphgrams described above.

The second shaft end is formed in the same way. A change of length of that part of the shaft which lies between the diaphragms may then be taken up by these diaphragms.

As already stated, each side member supports, in addition to the outer side members of the measuring roller, the shaft ends for two adjacent shafts.

Figure 6:
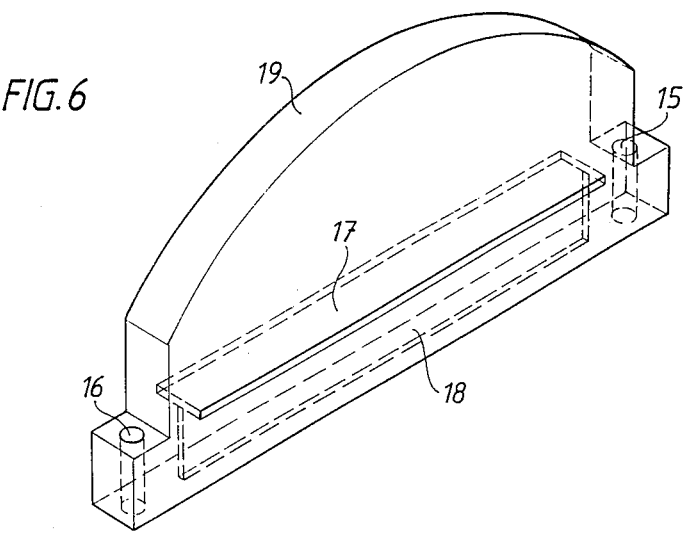
FIG. 6 shows how a saddle can be formed to be able to provide individual attachment of each shaft end.

Each side member is associated with a saddle according to FIG. 6. At each end the saddle is provided with a hole 15 and 16 for screwing the saddle to the side member. At a certain distance inside the ends, the saddle is divided by a slit, which in a preferred embodiment is parallel to the side surfaces of the side member. The saddle will then in principle consist of two detached beams 17 and 18. The shaft ends from two adjacent roller sections which are journalled in a side member may thus be individually attached to the side member.

In a preferred embodiment the saddle consists of an upper part 19 which covers the remaining space between the roller sections for protection of bearings, etc. This part must, of course, also in some suitable manner, for example by a slit parallel to the end surface of the side member, be disconnected from the two detached beams 17, 18. By allowing this slit to terminate immediately inside the ends of the saddle, all parts may be integrated into one unit.

Figure 7:
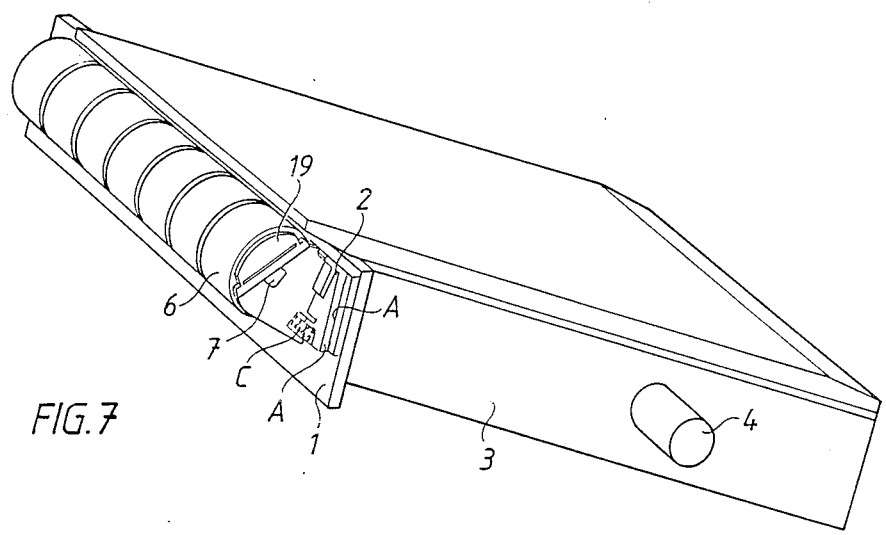
FIG. 7 shows a perspective view of a complete measuring roller consisting of seven roller sections mounted on a looper.

A complete measuring roller mounted on a looper is clear from FIG. 7 and may, for example, comprise seven roller sections.

By an embodiment adapted to the process in question, the flatness measuring device can be adapted for flatness measurement of hot-rolled and cold-rolled strip of both metallic and non-metallic materials.

We claim:

1. A flatness measuring device for rolled strip comprising a measuring roller divided into a number of roller sections, each comprising a shaft, ball bearings and an outer shell ring, side members supporting the shafts of the roller sections, a saddle for each side member for attachment of the roller sections, a common plate to which all side members are attached, and a force transducer in each side member, characterized in that the side members consist of there beams A, B and C, connected together in the form of a triangle, where the side members are fixed via beam A to the common plate, wherein a first end of beam B is fixed to a first end of beam A ia a flexible diaphragm, wherein the shafts from two adjacently positioned roller sections are attached at the second end of beam B to take up a force F generated by the rolled strip on each roller section, and wherein the third beam C connects second ends of beam A and B and consists of the force-sensing transducer.

2. A flatness measuring device for rolled strip according to claim 1, wherein the shafts of the roller sections, at the attachment to the side members, are formed with a first and a second diaphgram to reduce the stresses in the shafts caused by temperature difference between roller sections and the plate common to the side members, and a third diaphrgram to permit individual deflection of the side members.

3. A flatness measuring device for rolled strip according to claim 1, wherein that part of the saddle which makes contact wit the side members and the attachment of the shafts to the side members is shaped such that two detached beams are formed for individual attachment of the shafts.

4. A flatness measuring device for rolled strip according to claim 1, wherein the force transducer is a magnetoelastic transducer in which the measuring part constitutes an integral part of the side member.

5. A flatness measuring device for rolled strip according to claim 1, wherein the force transducer is a magnetoelastic transducer consisting of a separate, complete transducer mounted in the side member.

6. A flatness measuring device for rolled strip according to claim 1, wherein the force transducer is a strain gauge attached to a beam C in the form of an integral connection between the second ends of the beams A and B.

* * * * *